(12) United States Patent
Swar et al.

(10) Patent No.: US 12,677,119 B2
(45) Date of Patent: Jul. 7, 2026

(54) COMMUNICATION SYSTEM AND METHOD FOR A VEHICLE SYSTEM

(71) Applicant: Transportation IP Holdings, LLC, Norwalk, CT (US)

(72) Inventors: Padam Dhoj Swar, Clarksburg, MD (US); Carl L. Haas, Walkersville, MD (US); Brian Kurz, Thurmont, MD (US); Richard S. Klemanski, Walkersville, MD (US); Daniel McGee, Alexandria, VA (US); James Cowan, Pittsburgh, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 566 days.

(21) Appl. No.: 18/119,474

(22) Filed: Mar. 9, 2023

(65) Prior Publication Data

US 2023/0328491 A1     Oct. 12, 2023

Related U.S. Application Data

(60) Provisional application No. 63/362,560, filed on Apr. 6, 2022.

(51) Int. Cl.
*H04W 4/46* (2018.01)

(52) U.S. Cl.
CPC ..................................... *H04W 4/46* (2018.02)

(58) Field of Classification Search
CPC ......... H04W 4/46; H04W 4/40; H04W 88/04; H04W 88/06
See application file for complete search history.

(56) References Cited

U.S. PATENT DOCUMENTS

| | | | |
|---|---|---|---|
| 5,016,840 A | 5/1991 | Bezos | |
| 7,664,459 B2 | 2/2010 | Smith, Jr. et al. | |
| 8,073,582 B2 | 12/2011 | Kellner et al. | |
| 8,280,566 B2 | 10/2012 | Foy, III et al. | |
| 8,423,208 B2 | 4/2013 | Daum et al. | |
| 8,457,815 B2 | 6/2013 | Daum et al. | |

(Continued)

FOREIGN PATENT DOCUMENTS

| | | |
|---|---|---|
| CN | 110769363 A1 | 2/2020 |
| DE | 102016218982 B3 | 1/2018 |

(Continued)

*Primary Examiner* — Ayodeji O Ayotunde
(74) *Attorney, Agent, or Firm* — K&L Gates LLP

(57) ABSTRACT

A communication system may include communication devices configured to be onboard vehicles in a multi-vehicle system. Each of the communication devices may operate in a lead mode, a repeater mode, or a trail mode. The communication devices operating in the lead mode may transmit a command signal to control movement of the multi-vehicle system. The communication devices operating in the repeater mode may re-transmit the command signal received from the one or more communication devices operating in the lead mode. The communication devices operating in the trail mode may receive the command signal received from the one or more communication devices operating in the lead mode or in the repeater mode. Each of the communication devices may be remotely switched between the lead mode or the trail mode to the repeater mode.

19 Claims, 6 Drawing Sheets

(56) References Cited

U.S. PATENT DOCUMENTS

| | | | |
|---|---|---|---|
| 8,532,850 B2 | 9/2013 | Cooper et al. |
| 8,589,003 B2 | 11/2013 | Brand et al. |
| 8,620,553 B2 | 12/2013 | Kraeling et al. |
| 8,655,517 B2 | 2/2014 | Brand et al. |
| 8,702,043 B2 | 4/2014 | Daum et al. |
| 8,725,323 B2 | 5/2014 | Cooper et al. |
| 8,798,821 B2 | 8/2014 | Kraeling et al. |
| 8,825,239 B2 | 9/2014 | Cooper et al. |
| 8,903,574 B2 | 12/2014 | Cooper et al. |
| 8,914,189 B2 | 12/2014 | Kraeling et al. |
| 8,935,022 B2 | 1/2015 | Cooper et al. |
| 9,114,817 B2 | 8/2015 | Kraeling et al. |
| 9,120,490 B2 | 9/2015 | Kraeling |
| 9,180,892 B2 | 11/2015 | Cooper et al. |
| 9,379,775 B2 | 6/2016 | Cooper et al. |
| 9,419,816 B2 | 8/2016 | Daum et al. |
| 9,550,484 B2 | 1/2017 | Smith et al. |
| 9,580,091 B2 | 2/2017 | Kraeling et al. |
| 9,637,147 B2 | 5/2017 | Golden et al. |
| 9,656,680 B2 | 5/2017 | Kraeling et al. |
| 9,746,334 B1 | 8/2017 | Mahajan |
| 9,917,773 B2 | 3/2018 | Cooper et al. |
| 9,983,593 B2 | 5/2018 | Cooper et al. |
| 10,065,665 B2 | 9/2018 | Cooper et al. |
| 10,173,698 B2 | 1/2019 | Schoenly et al. |
| 10,331,121 B2 | 6/2019 | Cooper et al. |
| 10,457,281 B2 | 10/2019 | Brooks et al. |
| 10,464,579 B2 | 11/2019 | Cooper et al. |
| 10,611,348 B2 | 4/2020 | Zipfel et al. |
| 10,700,970 B2 | 6/2020 | Cooper et al. |
| 11,332,167 B2 | 5/2022 | Cooper et al. |

| | | | |
|---|---|---|---|
| 2002/0004693 A1 | 1/2002 | Collins | |
| 2004/0193334 A1 | 9/2004 | Carlsson et al. | |
| 2007/0112482 A1 | 5/2007 | Kane et al. | |
| 2009/0248226 A1 | 10/2009 | Kellner et al. | |
| 2012/0123617 A1 | 5/2012 | Noffsinger et al. | |
| 2012/0287972 A1 | 11/2012 | Noffsinger et al. | |
| 2012/0316708 A1 | 12/2012 | Kraeling et al. | |
| 2012/0316764 A1 | 12/2012 | Kraeling et al. | |
| 2012/0317282 A1 | 12/2012 | Kraeling et al. | |
| 2012/0325980 A1 | 12/2012 | Noffsinger et al. | |
| 2013/0022054 A1 | 1/2013 | Goodermuth et al. | |
| 2014/0121953 A1 | 5/2014 | Kraeling et al. | |
| 2015/0321683 A1 | 11/2015 | Kraeling et al. | |
| 2016/0075355 A1 | 3/2016 | Kellner et al. | |
| 2016/0197767 A1 | 7/2016 | Raeder et al. | |
| 2016/0229432 A1 | 8/2016 | Kellner et al. | |
| 2016/0267795 A1 | 9/2016 | Miyazawa et al. | |
| 2016/0313730 A1 | 10/2016 | Ricci et al. | |
| 2017/0289864 A1 | 10/2017 | Narasimha et al. | |
| 2017/0344023 A1 | 11/2017 | Laubinger et al. | |
| 2019/0141603 A1* | 5/2019 | Vulgarakis Feljan .. H04W 8/26 | |
| 2020/0133308 A1 | 4/2020 | Raichelgauz et al. | |
| 2021/0080948 A1 | 3/2021 | Franco et al. | |
| 2021/0094597 A1 | 4/2021 | Rush et al. | |
| 2021/0397180 A1 | 12/2021 | Thomas et al. | |
| 2022/0266876 A1 | 8/2022 | Cooper et al. | |
| 2023/0389096 A1* | 11/2023 | Otaka ................... H04W 72/25 | |

FOREIGN PATENT DOCUMENTS

| | | |
|---|---|---|
| JP | 6391817 B2 | 9/2018 |
| WO | 2005102018 A2 | 3/2005 |
| WO | 2019074242 A1 | 4/2019 |

* cited by examiner

Figure 5:
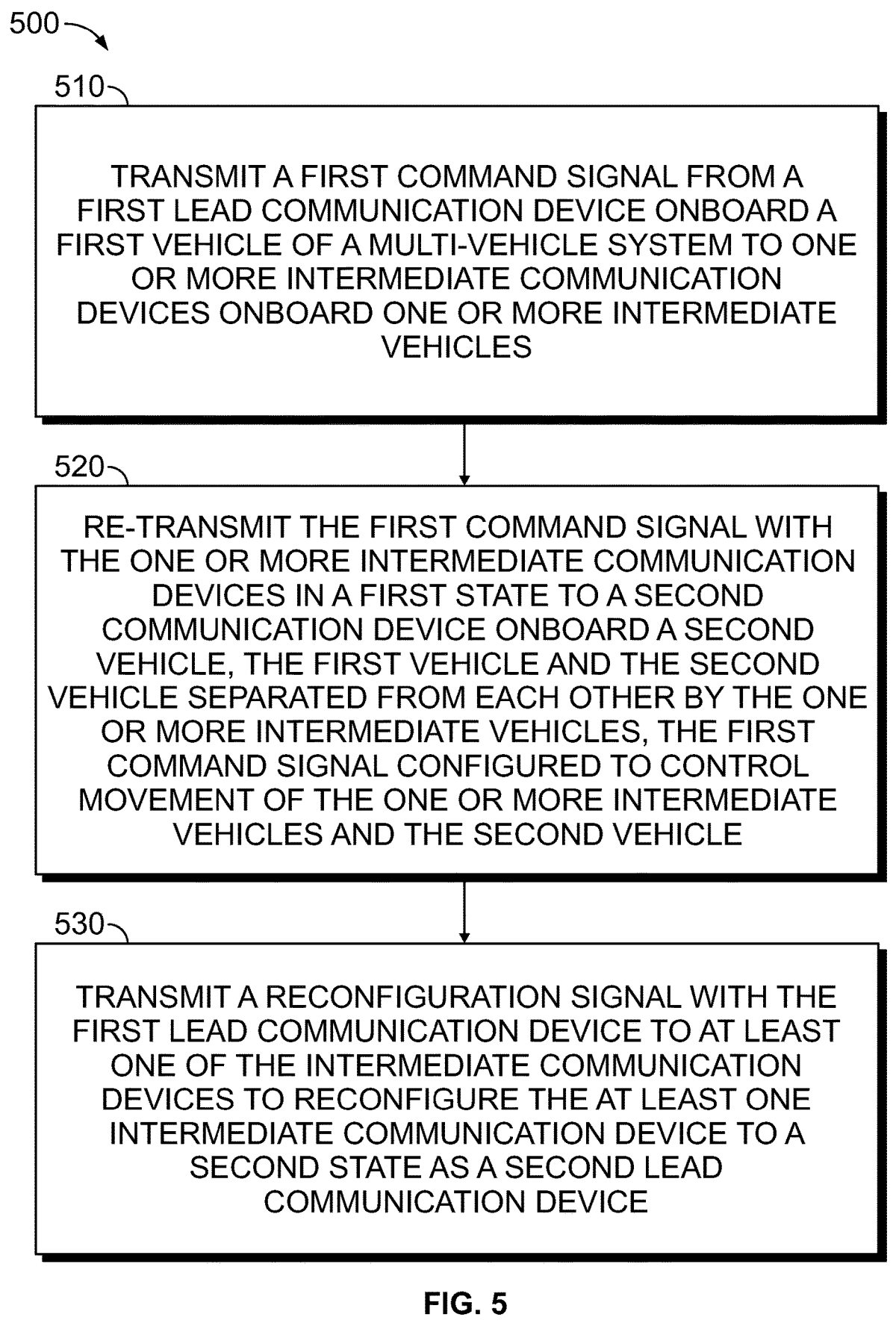

500 ⌐

510 ⌐

TRANSMIT A FIRST COMMAND SIGNAL FROM A FIRST LEAD COMMUNICATION DEVICE ONBOARD A FIRST VEHICLE OF A MULTI-VEHICLE SYSTEM TO ONE OR MORE INTERMEDIATE COMMUNICATION DEVICES ONBOARD ONE OR MORE INTERMEDIATE VEHICLES

520 ⌐

RE-TRANSMIT THE FIRST COMMAND SIGNAL WITH THE ONE OR MORE INTERMEDIATE COMMUNICATION DEVICES IN A FIRST STATE TO A SECOND COMMUNICATION DEVICE ONBOARD A SECOND VEHICLE, THE FIRST VEHICLE AND THE SECOND VEHICLE SEPARATED FROM EACH OTHER BY THE ONE OR MORE INTERMEDIATE VEHICLES, THE FIRST COMMAND SIGNAL CONFIGURED TO CONTROL MOVEMENT OF THE ONE OR MORE INTERMEDIATE VEHICLES AND THE SECOND VEHICLE

530 ⌐

TRANSMIT A RECONFIGURATION SIGNAL WITH THE FIRST LEAD COMMUNICATION DEVICE TO AT LEAST ONE OF THE INTERMEDIATE COMMUNICATION DEVICES TO RECONFIGURE THE AT LEAST ONE INTERMEDIATE COMMUNICATION DEVICE TO A SECOND STATE AS A SECOND LEAD COMMUNICATION DEVICE

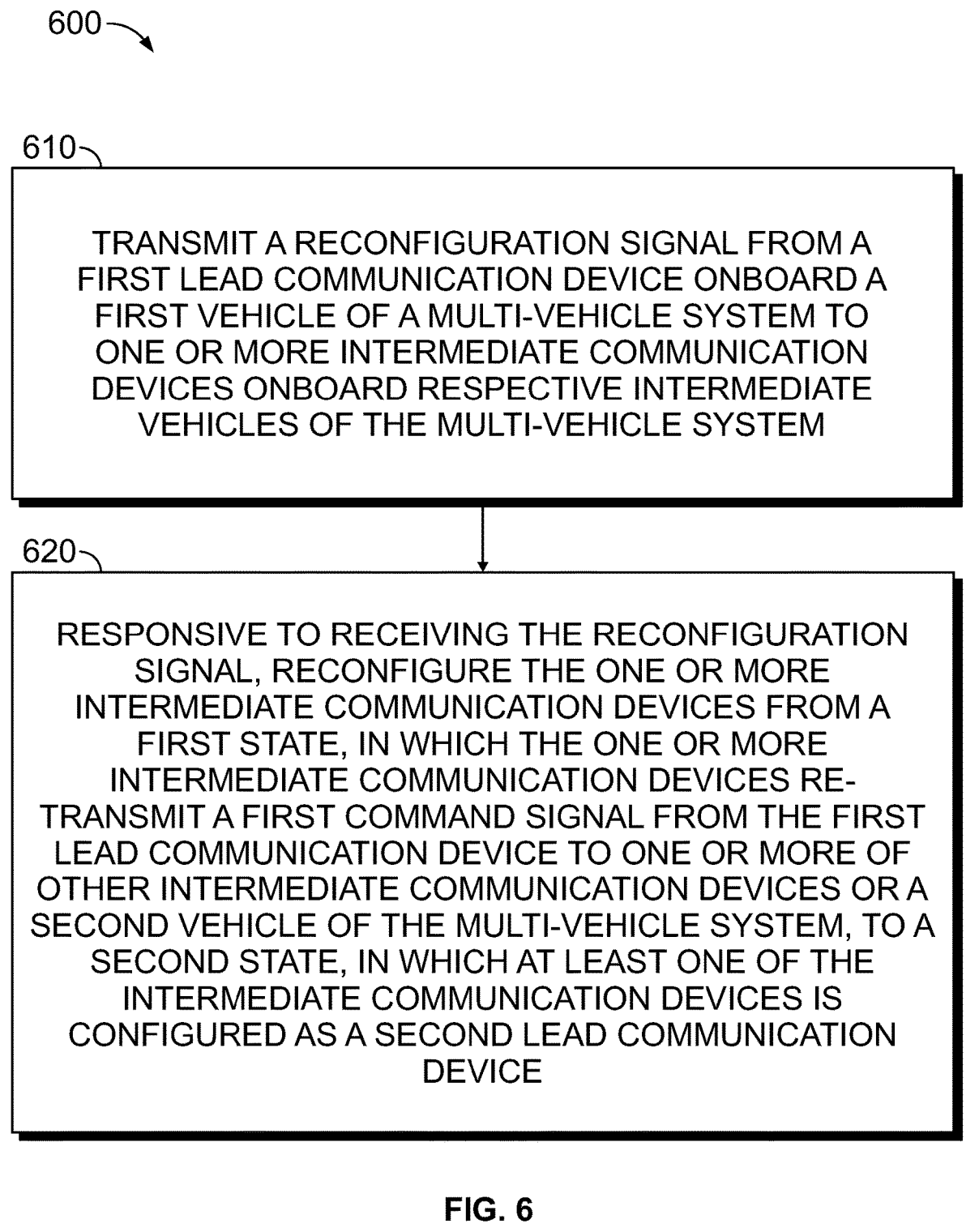

TRANSMIT A RECONFIGURATION SIGNAL FROM A FIRST LEAD COMMUNICATION DEVICE ONBOARD A FIRST VEHICLE OF A MULTI-VEHICLE SYSTEM TO ONE OR MORE INTERMEDIATE COMMUNICATION DEVICES ONBOARD RESPECTIVE INTERMEDIATE VEHICLES OF THE MULTI-VEHICLE SYSTEM

620

RESPONSIVE TO RECEIVING THE RECONFIGURATION SIGNAL, RECONFIGURE THE ONE OR MORE INTERMEDIATE COMMUNICATION DEVICES FROM A FIRST STATE, IN WHICH THE ONE OR MORE INTERMEDIATE COMMUNICATION DEVICES RE-TRANSMIT A FIRST COMMAND SIGNAL FROM THE FIRST LEAD COMMUNICATION DEVICE TO ONE OR MORE OF OTHER INTERMEDIATE COMMUNICATION DEVICES OR A SECOND VEHICLE OF THE MULTI-VEHICLE SYSTEM, TO A SECOND STATE, IN WHICH AT LEAST ONE OF THE INTERMEDIATE COMMUNICATION DEVICES IS CONFIGURED AS A SECOND LEAD COMMUNICATION DEVICE

FIG. 6

COMMUNICATION SYSTEM AND METHOD FOR A VEHICLE SYSTEM

CROSS-REFERENCE TO RELATED APPLICATIONS

This application claims priority to U.S. Provisional Application No. 63/362,560 (filed 6 Apr. 2022), the entire disclosure of which is incorporated herein by reference.

BACKGROUND

Technical Field

The disclosed subject matter relates to a communication system and method for a vehicle system.

Discussion of Art

Vehicle systems that include multiple vehicles may include communication devices in at least some of the vehicles to coordinate movement of the vehicles. In multi-vehicle systems that include many vehicles and/or extend over a large length or area, the number of communication devices needed to coordinate vehicle movements may increase. At least some of the communication devices may repeat, or re-transmit, signals from a lead vehicle or vehicles to other communication devices to increase the range of communication of the vehicle system.

In environments where multiple vehicle systems may be operating within communication range of each other, it is possible that a wireless communication from a first vehicle of a first multi-vehicle system intended for other vehicle(s) of the first multi-vehicle system may be received by vehicle(s) of a second vehicle system, which may lead the vehicle(s) of the second multi-vehicle system to operate in an unintended manner, for example by applying a braking system. To reduce the possibility of wireless communications from a first multi-vehicle system causing unintended operation of a second multi-vehicle system, communication devices onboard the multi-vehicle systems may be authorized or "armed" to receive only communications from a lead communication device(s) of their respective multi-vehicle system. Each communication device onboard the multi-vehicle system must be manually authorized or armed by the multi-vehicle system operator or other personnel to receive communications from the lead vehicle(s). In large multi-vehicle systems, the process of authorizing or arming the onboard communication devices may be time consuming. There is also the possibility that the operator or other personnel may miss one or more onboard communication devices in the authorizing or arming process which may result in one or more vehicles receiving communications from another multi-vehicle system and operating in an unintended manner.

Thus, a need may exist for a system and method for providing communication between vehicles of a multi-vehicle system that allows coordination of movement of the vehicles and prevents unintended operation of any of the vehicles.

BRIEF DESCRIPTION

In one example, a communication system may include communication devices configured to be onboard vehicles in a multi-vehicle system. Each of the communication devices may operate in a lead mode, a repeater mode, or a trail mode.

The communication devices operating in the lead mode may transmit a command signal to control movement of the multi-vehicle system. The communication devices operating in the repeater mode may re-transmit the command signal received from the one or more communication devices operating in the lead mode. The communication devices operating in the trail mode may receive the command signal received from the one or more communication devices operating in the lead mode or in the repeater mode. Each of the communication devices may be remotely switched between the lead mode or the trail mode to the repeater mode.

In another example, a method may include transmitting a command signal from a first communication device of several communication devices onboard a multi-vehicle system. The first communication device operates in a lead mode. The method also may include receiving the command signal at second communication devices of the communication devices onboard the multi-vehicle system. The second communication devices may operate in a trail mode. The method also may include controlling movement of the multi-vehicle system based on the command signal that is transmitted, selecting at least one of the second communication devices to switch to a repeater mode where the at least one of the second communication devices receives and re-transmits the command signal received from the first communication device, and remotely changing the at least one of the second communication devices that is selected to the repeater mode so that the at least one of the second communication devices in the repeater mode re-transmits the command signal received from the first communication device operating in the lead mode to one or more others of the second communication devices.

In another example, a communication system may include communication devices configured to be onboard vehicles in a multi-vehicle system. Each of the communication devices may operate in a lead mode, a repeater mode, or a trail mode. One or more of the communication devices operating in the lead mode may transmit a command signal to control movement of the multi-vehicle system. The communication devices operating in the repeater mode may re-transmit the command signal received from the one or more communication devices operating in the lead mode. The communication devices operating in the trail mode may receive the command signal received from the one or more communication devices operating in the lead mode or in the repeater mode. Each of the communication devices may be remotely switched between the lead mode or the trail mode to the repeater mode based on status information communicated by the communication devices and without requiring an operator to board vehicles on which the communication devices are disposed.

BRIEF DESCRIPTION OF THE DRAWINGS

The inventive subject matter may be understood from reading the following description of non-limiting embodiments, with reference to the attached drawings, wherein below:

FIG. 5 illustrates a flowchart of one example of a method for vehicle communication; and FIG. 6 illustrates a flowchart of another example of a method for vehicle communication.

DETAILED DESCRIPTION

Figure 1:
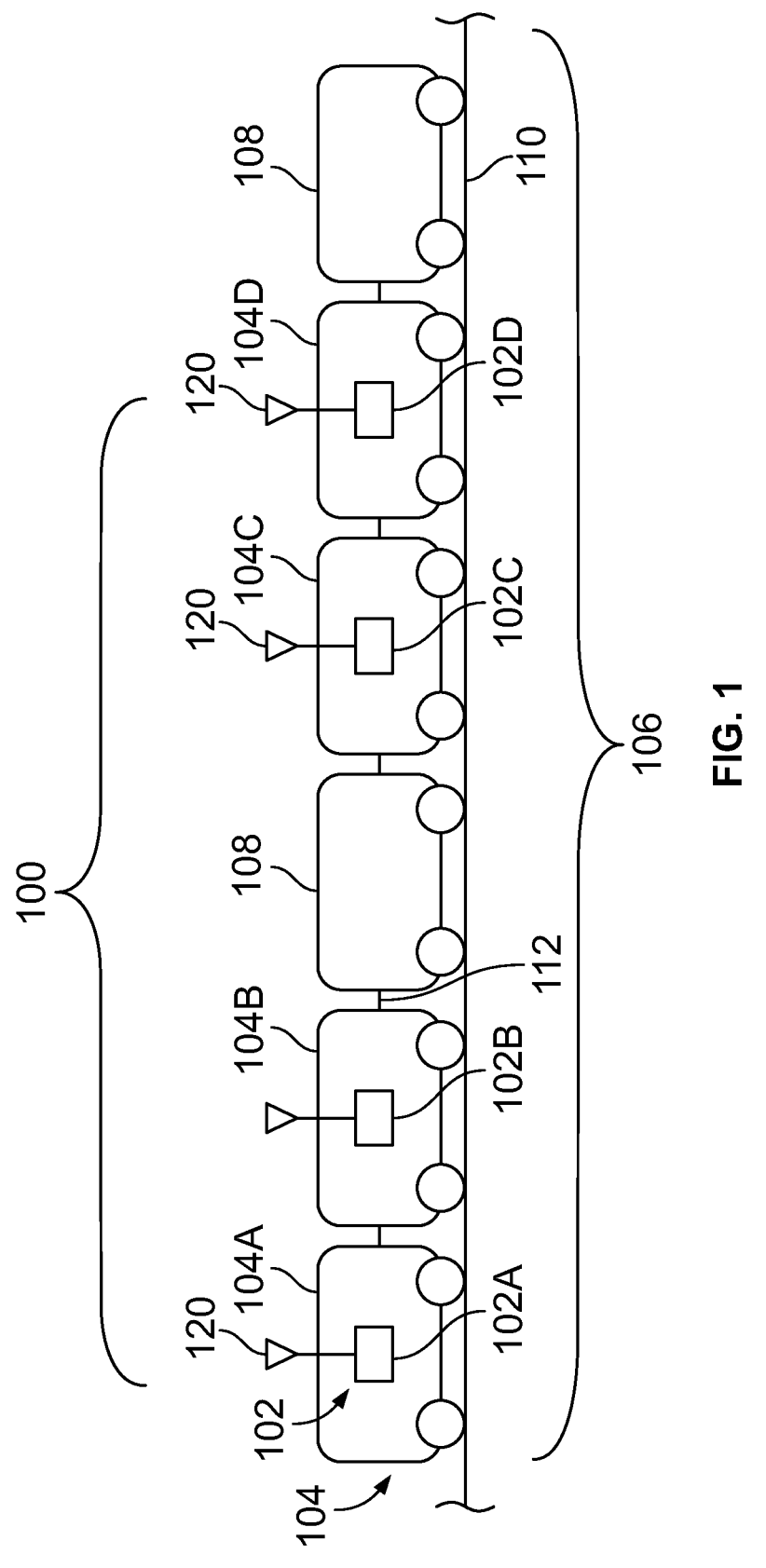
FIG. 1 illustrates one example of a communication system for a vehicle system.

Embodiments of the subject matter described herein relate to a communication system and method for a multi-vehicle system that allows coordination of movement of the vehicles in the vehicle system. The multi-vehicle system may be operated safely in the presence of other single or multi-vehicle systems by authorizing communication devices onboard vehicles of the multi-vehicle system to respond only to communications from a lead communication device(s) onboard a lead vehicle of the multi-vehicle system. The lead communication device(s) authorized to control operations of the vehicles in the multi-vehicle system may be identified by a code or other identifier that identifies the lead communication device(s). The remaining vehicles of the multi-vehicle system may be intermediate vehicles and a trail vehicle, such as a vehicle at or near an end of the multi-vehicle system relative to a direction of travel of the multi-vehicle system.

In large multi-vehicle systems, some of the communication devices may operate to repeat or re-transmit command signals from the lead communication device(s) to other intermediate vehicles and/or the trail (e.g., end) vehicle. The command signal may be a signal that requests information from the trail vehicle and/or intermediate vehicle(s). For example, the lead communication device may request a status (e.g., a brake system status or throttle setting) from the trail vehicle and/or an intermediate vehicle. The command signals may be used to control movement of the trail vehicle and/or an intermediate vehicle(s). For example, the lead communication device may adjust a throttle setting of the trail vehicle and/or an intermediate vehicle using a command signal. This permits coordination of the movement of the vehicles and safe operation of the multi-vehicle system along routes where line of sight communications may be obscured, for example during travel along curves, while entering or exiting a tunnel, while traveling in the tunnel, while entering, exiting, or traveling within an urban or densely populated area, while entering, exiting, or traveling in an area having increased wireless signal noise, etc. A control center and/or an offboard repeater may be used to communicate and/or repeat or retransmit command signals while the multi-vehicle system is operating within such situations or while operating in an environment where multiple multi-vehicle systems may be operating within communication range of each other and therefore interfering with the communication signals of each other.

Each communication device of the multi-vehicle system may operate as either a lead communication device that communicates command signals to control the operation of the vehicles, or as a repeater or re-transmitter that operates to repeat or re-transmit command signals from the lead communication device(s) (but does not operate as the originator or source of the command signals). The configuration of each communication device may be switched between lead communication device and repeater or re-transmitter. This switching may occur at the communication device or remotely (e.g., from off-board the vehicle in which the communication device is located).

A reconfiguration signal may be sent from a lead communication device of the multi-vehicle system, from the control center, or from another location. Communication devices that may be selected to act as lead communication devices may be ranked or weighted for selection based on various factors, such as an identification of the vehicle that the communication device is onboard; a location of the communication device (for example a location within the multi-vehicle system); a received signal strength indicator of signals received by the communication device from the lead communication device(s), other intermediate communication devices, the control center, and/or the offboard repeater; or the like.

The lead vehicle or lead communication device may not indicate the location of the vehicle or device in the vehicle system. For example, the lead communication device may be disposed onboard the first vehicle of the vehicle system along a direction of movement of the vehicle system. Optionally, the lead communication device may be disposed on another vehicle that is not at the head or leading end of the vehicle system relative to the direction of movement of the vehicle system. For example, the lead vehicle and/or lead communication device may be in the middle or at the trailing end of the vehicle system.

While one or more embodiments are described in connection with a rail vehicle system, not all embodiments relate to rail vehicle systems. Further, embodiments described herein extend to multiple types of vehicle systems. Suitable vehicle systems may include rail vehicle, automobiles, trucks (with or without trailers), buses, marine vessels, aircraft, mining vehicles, agricultural vehicles, and off-highway vehicles. Suitable vehicle systems described herein can be formed from a single vehicle. In other embodiments, the vehicle system may include multiple vehicles that move in a coordinated fashion. A suitable vehicle system may be a rail vehicle system that travels on tracks, or a vehicle system that travels on roads or paths. With respect to multi-vehicle systems, the vehicles can be mechanically coupled with each other (e.g., by couplers), or they may be virtually or logically coupled but not mechanically coupled. For example, vehicles may be communicatively but not mechanically coupled when the separate vehicles communicate with each other to coordinate movements of the vehicles with each other so that the vehicles travel together (e.g., as a convoy, platoon, swarm, fleet, and the like).

Referring to FIG. 1, a communication system 100 includes communication devices 102 disposed onboard propulsion-generating vehicles 104 of a multi-vehicle system 106 formed from the propulsion-generating vehicles and optionally one or more non-propulsion-generating vehicles 108. A suitable multi-vehicle system may be a rail vehicle system with the propulsion-generating vehicles being locomotives and the non-propulsion-generating vehicles being cargo cars, rail cars, passenger cars, or the like. Alternatively, a suitable multi-vehicle system can be a non-rail vehicle system formed from propulsion-generating vehicles and non-propulsion-generating vehicles. Non-rail vehicles may be mining vehicles, agricultural vehicles, passenger vehicles, on-road vehicles, marine vessels, and the like. The vehicles of the multi-vehicle system may be mechanically coupled with each other directly or indirectly. The vehicles may be mechanically connected with each other by couplers 112. In other embodiments, the vehicles may not be mechanically coupled with each other. Alternatively, or additionally, the vehicles may be logically coupled with each other for coordinated movement. The vehicles can travel together in the multi-vehicle system along one or more routes 110 (e.g., tracks, roads, paths, etc.).

Figure 2:
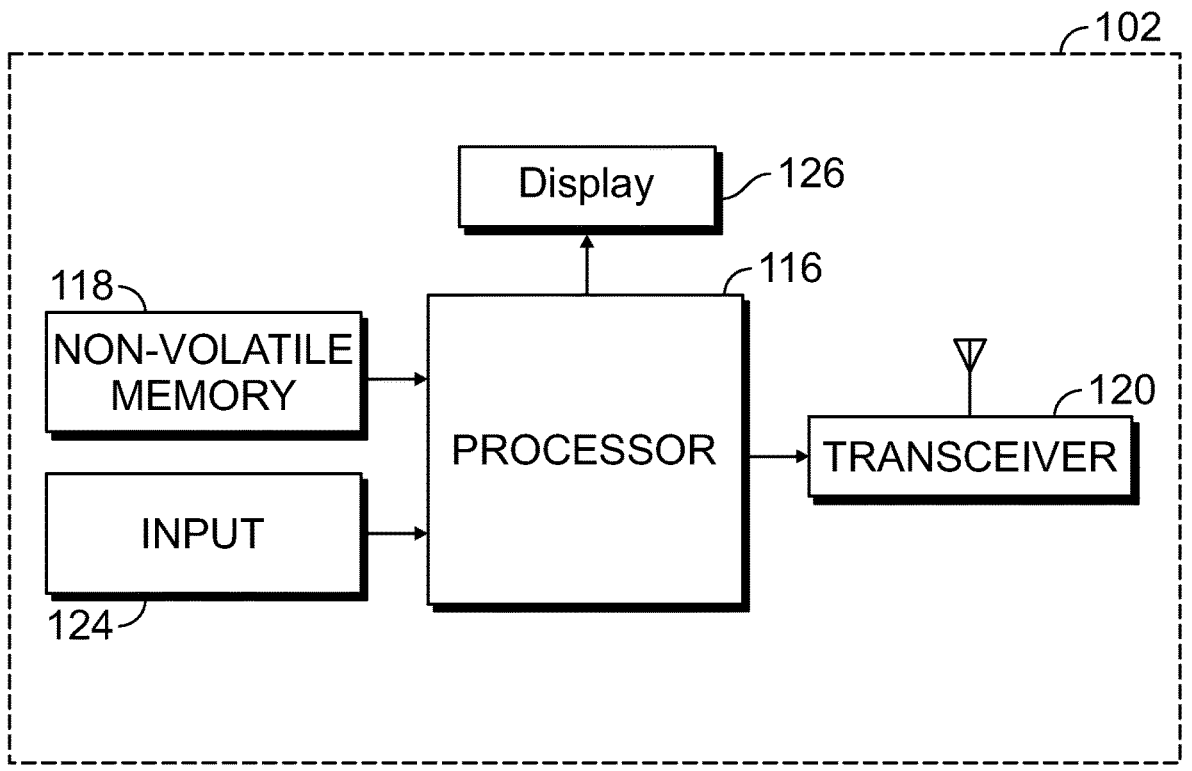
FIG. 2 illustrates one example of a communication device.

The communication devices represent hardware circuitry that includes and/or is connected with one or more processors (e.g., one or more microprocessors, one or more field programmable gate arrays, one or more integrated circuits, and/or the like) that perform the operations described herein in connection with the communication devices. Referring to FIG. 2, each communication device may include one or more processors, a computer readable, tangible, and non-transitory memory 18, and an input 124 through which an operator or other personnel of the multi-vehicle system can input commands for operation of the multi-vehicle system. The input can represent a keyboard, buttons, switches, a touchscreen, microphone, or the like. The communication device may include an electronic display 126 for presenting information on the operation of the multi-vehicle system and communication amongst the vehicles of the multi-vehicle system. The communication device may include a transceiver 120 that transmits and receives communications or signals. The transceiver may transmit signals to other communication devices of the multi-vehicle system or to a remote location or to communication devices of other multi-vehicle systems. The transceiver may receive signals from other communication devices of the multi-vehicle system, from a remote location, or from communication devices of other multi-vehicle systems. The transceiver can include transceiving circuitry such as modems, routers, antennas, switches, and the like. One or more other pieces of equipment onboard the vehicles of the multi-vehicle system can communicate data with each other via the communication devices.

The communication devices of the multi-vehicle system can communicate with each other to coordinate operations of the vehicles with each other. The communication devices may communicate with each other wirelessly. Each communication device may operate in different modes. In a first mode (also referred to as a leading or commanding mode), the communication device may operate as a lead communication device. While operating as a lead communication device, the communication device may send control or command signals to other communication devices to control movement of vehicles that receive the control or command signals. For example, a control or command signal may direct a change in a throttle setting of one or more propulsion-generating vehicles. As another example, a control or command signal may request information from one or more other vehicles equipped with a communication device. For example, a control or command signal may request a status of one or more systems of another vehicle(s), such as a throttle setting or a brake setting.

Each communication device operating in the leading mode, i.e., as a lead communication device, may transmit a reconfiguration signal to one or more other communication devices to change the operating mode of the other communication device(s). For example, a communication device may transmit a reconfiguration signal to another communication device that is in the leading mode (i.e., configured as a lead communication device) to reconfigure the communication device to a repeating mode (i.e., configured as a repeater or a re-transmitter). As another example, a first communication device operating as a lead communication device may transmit a reconfiguration signal to another communication device that is in the repeating mode (i.e., configured as a repeater or re-transmitter) to reconfigure the other communication device to the leading mode (i.e., configured as another, or second, lead communication device). In the repeating mode, the communication device may receive and re-send (or repeat) signals, but may not operate as the originator or source of the signals.

Each communication device may operate in the repeating mode to repeat or re-transmit a control signal(s) from one or more lead communication devices. In the repeating mode, a communication device may repeat or re-transmit a control or command signal unidirectionally. The communication device may repeat or re-transmit the control or command signal from, for example, only in a front to rear direction or only in a rear to front direction, instead of repeating or re-transmitting the signal in multiple directions (e.g., at least opposite directions). The communication device may repeat or re-transmit a control or command signal to one or more other vehicles or to an offboard communication device. One or more communication devices may not be operating in the lead or repeater modes, but may be operating in a listening, controlled, or trail mode (where the communication devices receive the command signals from the lead or repeater communication devices and cause the vehicles to change movement accordingly). These communication devices also may be able to switch modes to the repeater mode, as described herein.

One of the communication devices 102A may be a first lead communication device onboard a first propulsion-generating vehicle 104A. A second communication device 102D may be provided onboard a second propulsion-generating vehicle 104D. The remaining communication devices 102B-C may be intermediate communication devices onboard corresponding intermediate propulsion-generating vehicles 104B-C that separate the first and second propulsion-generating vehicles. According to one embodiment, the first lead communication device may be a head-of-vehicle device and the second communication device may be an end-of-vehicle device. With respect to rail vehicles, the head-of-vehicle device may include a head-of-train (HOT) device and the end-of-vehicle device may include an end-of-train (EOT) device.

The first lead communication device of the first propulsion-generating vehicle can remotely control movements of the intermediate propulsion-generating vehicles and the second propulsion-generating vehicle by wirelessly sending signals to the intermediate communication devices of the intermediate propulsion-generating vehicles and the second propulsion-generating vehicle. The communication devices of the multi-vehicle system may communicate with each other to communicate information regarding a status of one or more of the second propulsion-generating vehicle or an intermediate propulsion-generating vehicle(s). According to one embodiment, the communication devices may communicate with each other to determine a brake status of one or more of the second propulsion-generating vehicle or an intermediate propulsion-generating vehicle(s) and/or to request a change in a position of a valve of a brake system of one or more of the second propulsion-generating vehicle or an intermediate propulsion-generating vehicle, for example during an emergency brake application. According to one embodiment, the communication devices may communicate to transmit an image(s) from one or more of the second propulsion-generating vehicle or an intermediate propulsion-generating vehicle to the first propulsion-generating vehicle.

While the first propulsion-generating vehicle is shown in FIG. 1 at one end of the multi-vehicle system, the first propulsion-generating vehicle need not be located at either end of the multi-vehicle system or need not be located ahead of one or more of the intermediate propulsion-generating vehicles along a direction of travel of the multi-vehicle system. While the second propulsion-generating vehicle is shown at another end of the multi-vehicle system, the second propulsion-generating vehicle need not be located at an end of the multi-vehicle system or need not be located behind one or more of the intermediate propulsion-generating vehicles along the direction of travel of the multi-vehicle system. According to one example, a communication device may be provided onboard one or more non-propulsion-generating vehicles as a repeater or re-transmitter. A communication device(s) onboard a non-propulsion-generating vehicle(s) may be reconfigured as a lead communication device(s), for example if a lead communication device(s) onboard a propulsion-generating vehicle fails to operate as intended.

Figure 3:
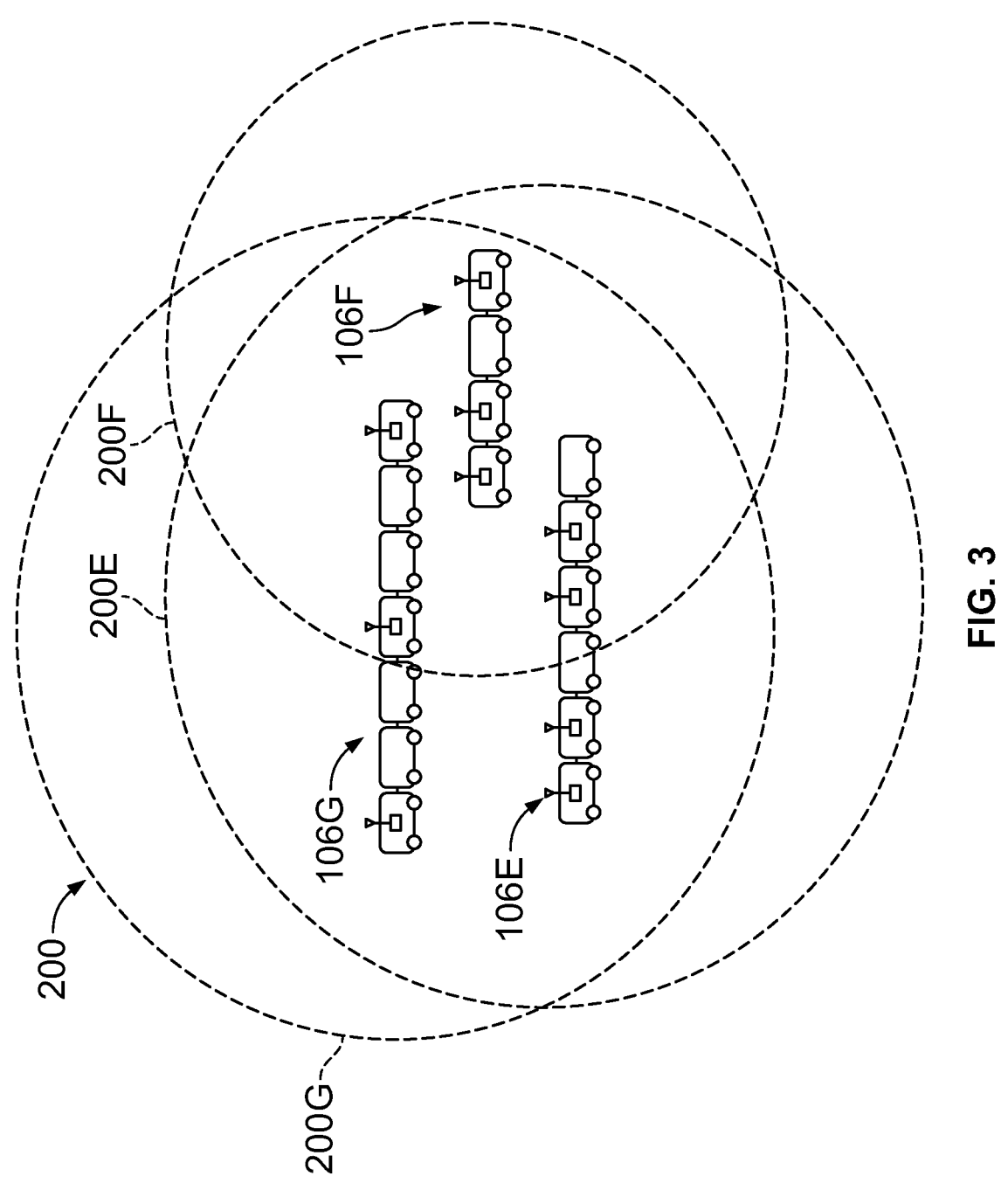
FIG. 3 illustrates one example of multi-vehicle systems each including one example of the communication system shown in FIG. 1.

Referring to FIG. 3, multiple multi-vehicles systems may be operating within wireless ranges of each other. For example, wireless signals sent by a first vehicle system may be received by a second vehicle system that is separate from the first vehicle system. The vehicle system 106E can represent the vehicle system 106 shown in FIG. 1, and the vehicle systems 106F, 106G can represent additional vehicle systems 106 that are separate from the vehicle system 106E but that include communication systems having wireless communication devices disposed onboard vehicles in the vehicle systems. Each communication system may have a wireless range 200E-G. As shown, the wireless ranges of different communication systems may overlap each other. If the communication systems use the same channel for sending wireless signals, then the wireless signals communicated between vehicles in one multi-vehicle system can interfere with the wireless signals communicated between the vehicles in another multi-vehicle system. Because these signals may include directions for changes in how the vehicles in the multi-vehicle systems operate (e.g., throttle setting changes and/or brake setting changes), interference with successful communication of the signals can pose a threat to safe operation of the multi-vehicle systems.

To prevent a communication device of a first multi-vehicle system from responding or reacting to a command signal from a second multi-vehicle system, the first lead communication device may communicate a code to the intermediate communication devices and the second communication device that identifies the first lead communication device as from the same multi-vehicle system. The code may be stored in the memories of the communication devices of the multi-vehicle systems and the processors of the intermediate communication devices, and the second communication devices may only respond to signals that include the code that identifies the signal as from a lead communication device of the multi-vehicle system.

Figure 4:
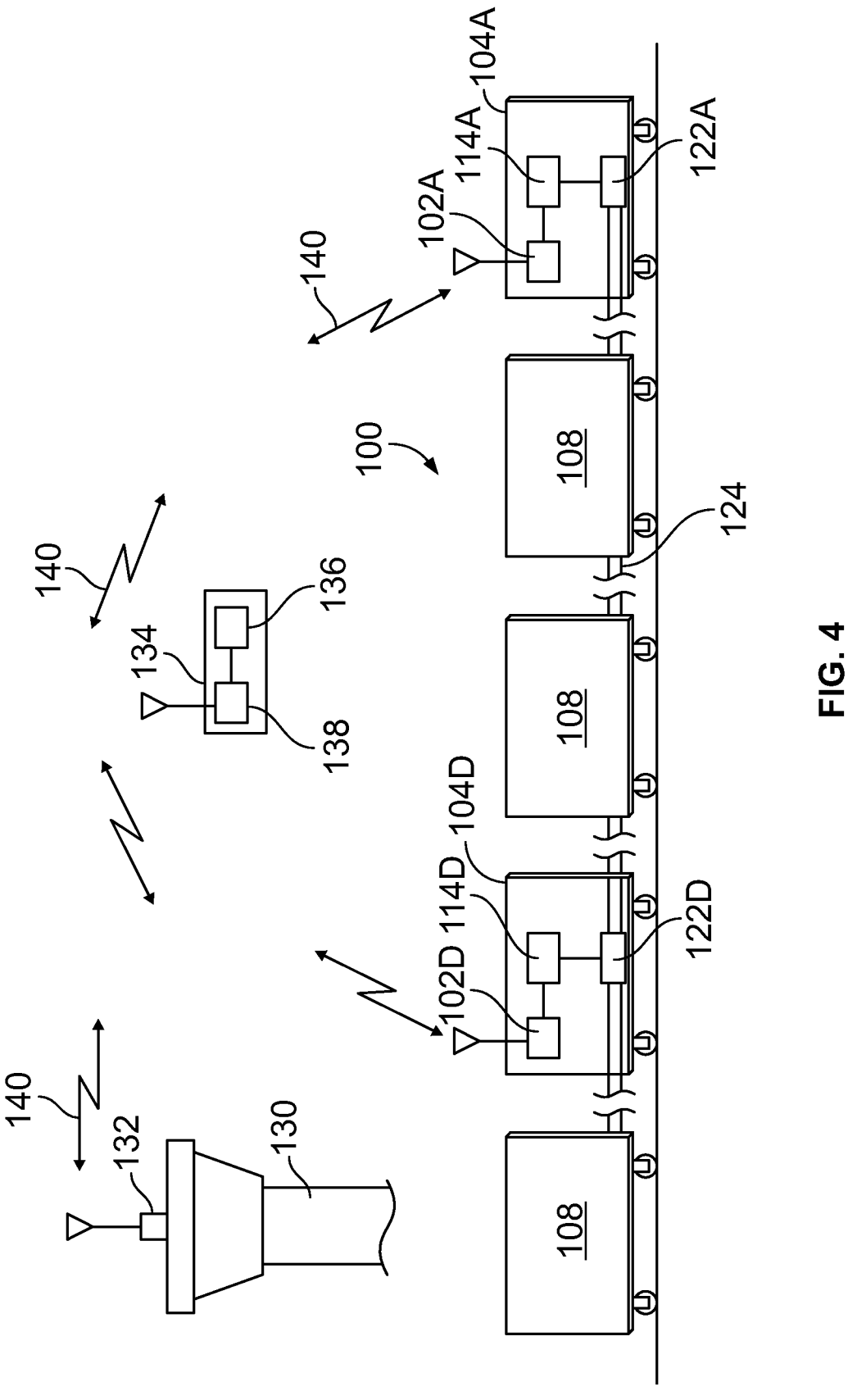
FIG. 4 illustrates another example of a multi-vehicle system having a communication system communicating with offboard communication devices.

Referring to FIG. 4, the multi-vehicle system may include a brake pipe 124 that conveys brake fluid (e.g., air) pressure changes specified by individual brake controllers 122 (e.g., 122A-122D) in the propulsion-generating vehicles. Each brake controller may include one or more components which cooperate to selectively hold or release pressure from the brake pipe and may include mechanical valves, electrical or electronic controls associated with those valves, or combinations thereof. Each of the propulsion-generating vehicles may be provided with a brake system which functions to apply brakes on the propulsion-generating vehicle upon a pressure drop in the brake pipe and to release the brakes upon a pressure rise.

Each propulsion-generating vehicle may include a vehicle controller 114 (e.g., 114A-114D) that is configured to control operation of the propulsion-generating vehicle. The vehicle controller may be configured to control operation of the propulsion-generating vehicle based on commands from one or more of an operator, command signals received from one or more lead communication devices, command signals received from one or more intermediate communication devices operating as a repeater or re-transmitter, or from command signals transmitted or repeated or re-transmitted from a remote location. Although only the first vehicle and the second vehicle are shown in the figure, it is understood that intermediate vehicles of the vehicle system each include a vehicle controller, a brake controller, and a communication device. The controller can represent hardware circuitry that includes and/or is connected with one or more processors that perform the operations described in connection with the controller.

A control center (e.g., tower) 130 including a transceiver 132 may communicate with the communication system of the multi-vehicle system by transmitting and receiving signals 140 to and from the communication system. An offboard repeater or re-transmitter 134 may include one or more processors 136 and a transceiver 138 to repeat or re-transmit the signals from the control center to the communication system of the multi-vehicle system and from the communication system to the control center. The offboard repeater may repeat or re-transmit signals from one or more lead communication devices of the vehicles to one or more intermediate communication devices and/or to the second communication device. The offboard repeater may repeat or re-transmit signals from the second communication device to one or more intermediate communication devices, one or more lead communication devices, and/or the control center.

The offboard repeater may be used in situations where direct communications between one or more lead communication devices and the intermediate communication devices and/or the second communication device are obstructed, such as while the multi-vehicle system is in a tunnel, or where line of sight communication may be otherwise obscured, such as over a long distance where the multi-vehicle system is traveling along a curve(s). The offboard repeater may be deployed at a location(s) with heavy multi-vehicle system traffic, for example a rail yard, to assist with repeating or re-transmitting communications between the vehicles of a multi-vehicle system. The transceiver of the offboard repeater may operate under the control of the one or more processors to receive and to repeat or re-transmit signals from one or more lead communication devices to one or more intermediate communication devices and/or the second communication device. The offboard repeater may receive signals from an intermediate communication device and repeat or re-transmit the signals to one or more of another intermediate communication device(s), one or more lead communication devices, the second communication device, and/or the control tower.

Each communication device may be configured to operate as a lead communication device. Each communication device may be configured to operate as a repeater or re-transmitter. A communication device configured to operate as a lead communication device can transmit command signals to one or more communication devices that are configured as repeaters or re-transmitters. A communication device configured as a repeater or re-transmitter does not generate command signals and only repeats or re-transmit a command signal received from a lead communication device or another communication device configured as a repeater or re-transmitter.

The intermediate communication devices of the intermediate propulsion-generating vehicles may be configured in a first state so that they only repeat, or re-transmit, command signals from a lead communication device of the first propulsion-generating vehicle. In the first state, each intermediate communication device re-transmits the command signals from the lead communication device to one or more other intermediate communication devices and/or to the second communication device. Depending on the power of each intermediate communication device, each intermediate communication device may be configured to re-transmit command signals from the lead communication device to the second communication device or to one or more other intermediate communication devices.

Each communication device may be configured to repeat or re-transmit command signals in the first state until being reconfigured to a second state in which the communication device acts as a lead communication device, for example by generating command signals to be transmitted to intermediate propulsion-generating vehicles and/or the second propulsion-generating vehicle to control operation of the intermediate propulsion-generating vehicles and/or the second vehicle. Each communication device in the first state may be configured to communicate its current configuration. The communication device may periodically communicate its current configuration to one or more lead communication devices, the second communication device, the offboard repeater, and/or the control center. The communication device may communicate its current configuration in response to a query from one or more lead communication devices, the second communication device, the offboard repeater, and/or the control center. The communication device may communicate, along with its current configuration, its capability to repeat or re-transmit signals. The communication device may communicate an identification of the vehicle it is onboard. The communication device may communicate location information of the vehicle it is onboard. The communication device may communicate a received signal strength indicator (RSSI) of the signals it receives from one or more lead communication devices, one or more intermediate communication devices, the second communication device, an offboard repeater, and/or the control center. The communication device may communicate a brake pipe pressure of the vehicle it is onboard.

The display of each communication device, or a display of each vehicle controller, may display the current configuration of the communication device. The display may indicate that the communication device is in the first state and only able to repeat or re-transmit signals that it receives. The display may also indicate that communication device is able to repeat or re-transmit signals either unidirectionally or bidirectionally. The display may indicate a direction that the communication device may repeat or re-transmit the signals. For example, the display may indicate that the communication device may unidirectionally repeat or re-transmit the signals from a forward direction of the multi-vehicle system toward a rearward section, or from a rearward direction of the multi-vehicle system toward a forward section. The display may display an available power level, for example a radio frequency (RF) power level, it may have to transmit, repeat or re-transmit signals. The display may display the RSSI of the signals that the communication device receives from other communication devices, the offboard repeater, and/or the control center.

Each vehicle controller may be configured to allow the operator or other vehicle system personnel to switch the configuration of one or more communication devices. The configuration of each communication device may be switched manually in the vehicle or may be switched remotely from another communication device configured to function as a lead communication device. The configuration of each communication device may be switched remotely from the control center. A reconfiguration signal may be communicated from another communication device functioning as a lead communication device or from the control center.

One or more communication devices may be configured to operate as second lead communication devices. A vehicle controller may display to an operator the communication devices that may be configured to operate as lead communication devices. The control center may display to a remote operator the communication devices that may be configured to operate as second lead communication devices. The communication devices that may be configured to operate as second lead communication devices may be selected based on an identification of the vehicle the communication device is onboard, a location of the vehicle the communication device is onboard (for example, the location or position of the vehicle within the multi-vehicle system), and/or a RSSI of the communication device. Communication devices that may be reconfigured to operate as second lead communication devices may be ranked on the vehicle identification, the vehicle location, and the RSSI. Communication devices that match certain vehicle identifications and have stronger RSSI may be ranked higher for reconfiguration as second lead communication devices. An operator may a brake pipe continuity check to verify that all communication devices configured to act as lead communication devices are on the same multi-vehicle system.

Referring to FIG. 5, a method 500 may include a step 510 of transmitting a first command signal from a first lead communication device onboard a first vehicle of a multi-vehicle system to one or more intermediate communication devices onboard one or more intermediate vehicles and step 520 of re-transmitting the first command signal with the one or more intermediate communication devices in a first state to a second communication device onboard a second vehicle, the first vehicle and the second vehicle separated from each other by the one or more intermediate vehicles, the first command signal configured to control movement of the one or more intermediate vehicles and the second vehicle. The method may include a step 530 of transmitting a reconfiguration signal with the first lead communication device to at least one of the intermediate communication devices to reconfigure the at least one intermediate communication device to a second state as a second lead communication device.

Referring to FIG. 6, a method 610 may include a step 610 of transmitting a reconfiguration signal from a first lead communication device onboard a first vehicle of a multi-vehicle system to one or more intermediate communication devices onboard respective intermediate vehicles of the multi-vehicle system and a step 620 of, responsive to receiving the reconfiguration signal, reconfiguring the one or more intermediate communication devices from a first state, in which the one or more intermediate communication devices re-transmit a first command signal from the first lead communication device to one or more of other intermediate communication device or a second vehicle of the multi-vehicle system, to a second state, in which at least one of the intermediate communication devices is configured as a second lead communication device.

The communication devices that are not currently operating as repeaters or repeater communication devices can send status information to the lead communication device or other non-repeater communication devices repeatedly (periodically or aperiodically) or on request. This status information can indicate whether the communication device sending the information is capable (e.g., functional) of operating as a repeater. A communication device can be capable of operating as a repeater while the communication device is activated, healthy, not in a fault state, etc., and not currently operating as a repeater. Optionally, a communication device can be capable of operating as a repeater while the communication device is not currently operating as a lead communication device, but may be already operating as a repeater. The status information can include the current operating mode, such as whether the communication device is operating as a lead communication device, a repeating communication device, or a trail communication device.

The status information can include an identifier or identification of the vehicle in which the communication device sending the status information is located. The status information can include the geographic location of the communication device or the vehicle in which the communication device is disposed. For example, the geographic location can include a global navigation satellite system (GNSS) receiver coordinates (e.g., global positioning system (GPS) receiver coordinates), a location determined from a dead reckoning system, a location determined from communication with roadside transponders, a location determined from operator input, etc.

The status information may include a signal strength, or RSSI, for signals communicated between the lead communication device and the communication device sending the status information. Optionally, the signal strength may be sent for the wireless signals communicated between the communication device sending the status information (e.g., the status reporting communication device) and the lead communication device, and for the wireless signals communicated between the status reporting communication device and the trail communication device or the communication device at the EOT or trailing end of the vehicle system. The status information may include the brake pipe pressure measured by one or more pressure transducers or other sensors in the same vehicle where the status reporting communication device is located.

The status information can be received by the lead communication device and the lead communication device or the vehicle controller can decide whether to make the status reporting communication device a repeater device based at least in part on this information. Optionally, the status information can be received by the control center that is off-board the vehicle system and the control center can decide whether to make the status reporting communication device a repeater device based at least in part on this information.

For example, if the status information indicates that the status reporting communication device is currently capable of operating as a repeater, if the status reporting communication device is not currently operating as a lead communication device, if the identifier of the vehicle in which the status reporting communication device is located is included within a list or other data structure of vehicle identifiers associated with (e.g., included in) the multi-vehicle system where the lead communication device is located, if the location of the status reporting communication device or the vehicle in which the status reporting communication device is located is within a designated range or distance (e.g., the total length or distance of the multi-vehicle system) along a path defined by the route (which indicates that the status reporting communication device is in the same vehicle system as the lead communication device), if the signal strength for communications between the status reporting communication device and the lead communication device exceeds a designated threshold strength, if the signal strength for communications between the status reporting communication device and the trail communication device or EOT exceeds a designated threshold strength, and/or if the brake pipe pressure reported by the status reporting communication device is within an acceptable defined range, then the lead communication device, vehicle controller, and/or control center can direct the status reporting communication device to switch operating modes to operate as a repeater. Optionally, the lead communication device can switch to operating as a repeater.

Not all the above factors need to be satisfied before switching the operating mode of a communication device to that of a repeater. For example, the operating mode may be switched to a repeater responsive to at least a threshold number of the factors being satisfied, or at least a few required factors (e.g., the signal strength factors, the capability, and the location) being satisfied. Optionally, the different factors may be weighted differently. For example, the signal strength, capability, and location factors may be weighed more heavily in the decision than the other factors. In another example, the status reporting communication devices may sorted based on those having identifiers or associated with vehicle identifies in the same vehicle system. Those having identifiers that are not included in the same vehicle system may be excluded, while those having identifiers associated with the same vehicle system may be considered. These considered communication devices may then be ordered or ranked based on one or both the signal strength factors. For example, the communication devices being considered may be placed into an order from the strongest reported RSSI with the lead vehicle and with the trail or end vehicle of the vehicle system. The brake pipe pressures reported by the reporting communication devices can be examined to determine whether these communication devices are on the same vehicle system (as different vehicle systems may have different brake pressures, the brake pressures reported by the reporting communication devices will be within a designated range of each other).

The vehicle controller, control center, or lead vehicle system may then select a communication device to operate as a repeater. For example, after eliminating the communication devices that are not onboard the same vehicle system (using the identifiers and/or brake pipe pressures), the communication device(s) having a greatest or greater signal strengths (than one or more, or all, other communication devices) to either the front end of the vehicle system and/or the rear or trailing end of the vehicle system may be selected to operate as a repeater. The vehicle controller, control center, or lead vehicle system can direct the selected communication device(s) to operate as a one way repeater that only repeats signals to either the front end or the trail end of the vehicle system, or to operate as a two way repeater that repeats signals to both the front end or the trail end of the vehicle system. The mode of operation of each of the communication devices can be changed between lead, repeater, and/or trail remotely and without requiring an operator to enter onboard the vehicle having the communication device whose mode is being switched. This can significantly increase the speed at which modes of the communication devices are changed when compared with existing systems that may require the operator to board every vehicle having a communication device whose mode is to be switched.

In one embodiment, the communication system may have a local data collection system deployed that may use machine learning to enable derivation-based learning outcomes. The vehicle controller or communication devices may learn from and make decisions on a set of data (including reported status information provided by the various communication devices), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the system may include a policy engine that may apply one or more policies. These policies may be based at least in part on characteristics of a given item of equipment or environment. With respect to control policies, a neural network can receive input of a number of environmental and task-related parameters. These parameters may include reported statuses from the communication devices, such as the capabilities to operate as repeaters, the current modes, the vehicle identifiers, the location, the signal strengths, the brake pressures, etc. The neural network can be trained to generate an output based on these inputs, with the output representing whether the communication device is to switch modes to the repeater mode. During operation of one embodiment, a determination can occur by processing the inputs through the parameters of the neural network to generate a value at the output node designating that action as the desired action (e.g., to switch the mode of the communication device to that of a repeater). This action may translate into a signal that causes the communication device to switch modes. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The vehicle controller, control center, and/or communication device can use this artificial intelligence or machine learning to receive input (e.g., the reported status information), use a model that associates different combinations of the values in the status information) with different operating modes to select an operating mode of the communication device(s), and then provide an output (e.g., the operating mode selected for a communication device using the model). The vehicle controller, control center, and/or communication device may receive additional input of the change in operating mode that was selected, such as analysis of noise or interference in communication signals (or a lack thereof), operator input, or the like, that indicates whether the machine-selected operating mode provided a desirable outcome or not. Based on this additional input, the vehicle controller, control center, and/or communication device can change the model, such as by changing which operating mode would be selected when a similar or identical set of status information values is received during the next time or iteration. The vehicle controller, control center, and/or communication device can then use the changed or updated model again to select an operating mode, receive feedback on the selected operating mode, change or update the model again, etc., in additional iterations to repeatedly improve or change the model using artificial intelligence or machine learning.

A system may include a plurality of communication devices that may be onboard a plurality of vehicles of a multi-vehicle system. Each communication device may be operable in a first mode to transmit a command signal to one or more other communication devices and operable in a second mode to re-transmit the command signal from the one or more other communication devices. Each communication device may, when operable in the first mode, transmit a first reconfiguration signal to the one or more other communication devices that are operable in the first mode. The one or more other communication devices, responsive to receipt of the first reconfiguration signal, may be reconfigured to operate in the second mode.

Each communication device may, when operable in the first mode, transmit a second reconfiguration signal to one or more other communication devices that are operable in the second mode. The one or more other communication devices, responsive to receipt of the second configuration signal, may be reconfigured to operate in the first mode.

Each communication device operable in the second mode may be controlled by an offboard control device to re-transmit the command signal to the one or more other communication devices.

Each communication device operable in the second mode may re-transmit an offboard command signal generated by the offboard control device to the one or more other communication devices.

Each communication device operable in the second mode may re-transmit an offboard command signal received from an offboard communication device that receives the command signal from one or more communication devices operable in the first mode.

Each communication device operable in the second mode may re-transmit the command signal based on one or more of (a) a re-transmission capability of the communication device, (b) a current mode of the communication device, (c) an identification of the vehicle of the communication device, (d) location information of the communication device, (e) a first received signal strength from one or more other communication devices operable in the first mode, (f) a second received signal strength from one or more other communication devices operable in the second mode, or (g) a brake pipe pressure of the vehicle of the communication device.

The first reconfiguration signal may reconfigure the one or more communication devices based on one or more of (a)-(g).

A first communication device having a first received signal strength may be reconfigured to the second mode before a second communication device having a second received signal strength is reconfigured to the second mode when the second received signal strength is less than the first received signal strength.

The first reconfiguration signal may change a power level of the one or more other communication devices.

The one or more other communication devices in the second mode may re-transmit the command signal unidirectionally or bidirectionally.

A method may include transmitting a first command signal from a first communication device operating in a first mode onboard a first vehicle of a multi-vehicle system to one or more intermediate communication devices onboard one or more intermediate vehicles of the multi-vehicle system. The method may include re-transmitting the first command signal with the one or more intermediate communication devices operating in a second mode to a second communication device onboard a second vehicle. The first vehicle and the second vehicle may be separated from each other by the one or more intermediate vehicles. The method may include transmitting a reconfiguration signal with the first communication device to at least one of the intermediate communication devices to reconfigure the at least one intermediate communication device to operate in the first mode.

The method may include transmitting a second command signal with the at least one intermediate communication device operating in the first mode.

The method may include re-transmitting the first command signal with an offboard control device to re-transmit the first command signal to the one or more intermediate communication devices or the second communication device.

The method may include transmitting an offboard command signal generated by the offboard control device to the one or more intermediate communication devices or the second communication device.

The method may include re-transmitting the first command signal with an offboard communication device that receives the first command signal from the first lead communication device.

The method may include transmitting from the one or more intermediate communication devices information regarding (a) a retransmission capability of the one or more intermediate communication devices, (b) a current mode of the one or more intermediate communication devices, (c) an identification of the one or more intermediate vehicles of the one or more intermediate communication devices, (d) location information of the one or more intermediate communication devices, (e) a first received signal strength from the one or more other intermediate communication devices operating in the first mode, (f) a second received signal strength from the one or more communication devices operating in the second mode, or (g) a brake pipe pressure of the one or more intermediate vehicles to one or more of the first communication device or an offboard communication device. The method may include transmitting the reconfiguration signal from the first communication device to one or more of the intermediate communication devices to reconfigure the one or more intermediate communication devices to the first mode based on one or more of (a)-(g).

The method may include reconfiguring a first intermediate communication device of a first intermediate vehicle having a first received signal strength before a second intermediate communication device of a second intermediate vehicle having a second received signal strength when the second received signal strength is less than the first received signal strength.

The reconfiguration signal may change a power level of the at least one intermediate communication device.

A method may include transmitting a reconfiguration signal from a first communication device operating in a first mode onboard a first vehicle of a multi-vehicle system to one or more other communication devices onboard one or more other vehicles of the multi-vehicle system. The method may include, responsive to receiving the reconfiguration signal, reconfiguring the one or more other communication devices from the first mode to a second mode in which the one or more of other communication devices re-transmit signals received from the first communication device or one or more of the other communication devices.

The method may include determining a brake pipe pressure in the first vehicle and the one or more other vehicles to verify that the one or more other communication devices are in the same multi-vehicle system as the first communication device.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one example, a communication system may include communication devices configured to be onboard vehicles in a multi-vehicle system. Each of the communication devices may operate in a lead mode, a repeater mode, or a trail mode. The communication devices operating in the lead mode may transmit a command signal to control movement of the multi-vehicle system. The communication devices operating in the repeater mode may re-transmit the command signal received from the one or more communication devices operating in the lead mode. The communication devices operating in the trail mode may receive the command signal received from the one or more communication devices operating in the lead mode or in the repeater mode. Each of the communication devices may be remotely switched between the lead mode or the trail mode to the repeater mode.

The communication devices operating in the lead mode may select which of the one or more communication devices operating in the trail mode are to be switched to the repeater mode. Each of the communication devices may be remotely switched between the lead mode or the trail mode to the repeater mode based on a second signal received from a control center that is off-board the multi-vehicle system.

Each of the communication devices may be remotely switched between the lead mode or the trail mode to the repeater mode with the communication device switched to the repeater mode being configured to repeat the command signal in a single direction toward a front end or an opposite trailing end of the multi-vehicle system. The communication devices may report status information representing operational conditions of the communication devices. Each of the communication devices may be remotely switched between the lead mode or the trail mode to the repeater mode based on the status information.

The status information may include one or more of capabilities of the communication devices to operate in the repeater mode, current operating modes of the communication devices, identifiers of vehicles in which the communication devices are disposed, locations of the communication devices, signal strengths of signals transmitted or re-transmitted by the communication devices, or brake pressures measured onboard the vehicles where the communication devices are located. The signal strengths may be associated with the signals transmitted or re-transmitted by the communication devices toward a lead end of the multi-vehicle system. Or, the signal strengths may be associated with the signals transmitted or re-transmitted by the communication devices toward a trail end of the multi-vehicle system.

Each of the communication devices may be remotely switched between the lead mode or the trail mode to the repeater mode without requiring an operator to board vehicles in which the communication devices are disposed.

In another example, a method may include transmitting a command signal from a first communication device of several communication devices onboard a multi-vehicle system. The first communication device operates in a lead mode. The method also may include receiving the command signal at second communication devices of the communication devices onboard the multi-vehicle system. The second communication devices may operate in a trail mode. The method also may include controlling movement of the multi-vehicle system based on the command signal that is transmitted, selecting at least one of the second communication devices to switch to a repeater mode where the at least one of the second communication devices receives and re-transmits the command signal received from the first communication device, and remotely changing the at least one of the second communication devices that is selected to the repeater mode so that the at least one of the second communication devices in the repeater mode re-transmits the command signal received from the first communication device operating in the lead mode to one or more others of the second communication devices.

The first communication device operating in the lead mode may select the at least one of the second communication devices to switch to the repeater mode. Or, a control center located off-board the multi-vehicle system may select the at least one of the second communication devices to switch to the repeater mode.

The method also may include re-transmitting at least one additional command signal received from the first communication device operating in the lead mode to one or more others of the second communication devices using the at least one of the second communication devices operating in the repeater mode. The second communication device(s) may re-transmit the at least one additional command signal in a single direction toward a front end or an opposite trailing end of the multi-vehicle system.

The second communication device may be selected to switch to the repeater mode based on status information representing operational conditions of the second communication devices. The status information may include one or more of capabilities of the second communication devices to operate in the repeater mode, current operating modes of the second communication devices, identifiers of vehicles in which the second communication devices are disposed, locations of the second communication devices, signal strengths of signals transmitted or re-transmitted by the second communication devices, or brake pressures measured onboard the vehicles where the second communication devices are located. The signal strengths may be associated with the signals transmitted or re-transmitted by the second communication devices toward a lead end of the multi-vehicle system or toward a trail end of the multi-vehicle system. Each of the second communication devices may be remotely switched between the lead mode or the trail mode to the repeater mode without requiring an operator to board vehicles in which the second communication devices are disposed.

In another example, a communication system may include communication devices configured to be onboard vehicles in a multi-vehicle system. Each of the communication devices may operate in a lead mode, a repeater mode, or a trail mode. One or more of the communication devices operating in the lead mode may transmit a command signal to control movement of the multi-vehicle system. The communication devices operating in the repeater mode may re-transmit the command signal received from the one or more communication devices operating in the lead mode. The communication devices operating in the trail mode may receive the command signal received from the one or more communication devices operating in the lead mode or in the repeater mode. Each of the communication devices may be remotely switched between the lead mode or the trail mode to the repeater mode based on status information communicated by the communication devices and without requiring an operator to board vehicles on which the communication devices are disposed.

The status information may include one or more of signal strengths of signals transmitted or re-transmitted by the communication devices, or brake pressures measured onboard the vehicles where the communication devices are located.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
communication devices configured to be onboard vehicles in a multi-vehicle system, each of the communication devices configured to operate in a lead mode, a repeater mode, or a trail mode, one or more of the communication devices operating in the lead mode configured to transmit a command signal to control movement of the multi-vehicle system, the communication devices operating in the repeater mode configured to re-transmit the command signal received from the one or more communication devices operating in the lead mode, the communication devices operating in the trail mode configured to receive the command signal received from the one or more communication devices operating in the lead mode or in the repeater mode, wherein each of the communication devices is configured to be remotely switched between the lead mode or the trail mode to the repeater mode, wherein a communication device of the communication devices is configured to switch to the repeater mode based on a strength of the command signal received.

2. The system of claim 1, wherein the one or more communication devices operating in the lead mode are configured to select which of the one or more communication devices operating in the trail mode are to be switched to the repeater mode.

3. The system of claim 1, wherein each of the communication devices is configured to be remotely switched between the lead mode or the trail mode to the repeater mode based on a second signal received from a control center that is off-board the multi-vehicle system.

4. The system of claim 1, wherein each of the communication devices is configured to be remotely switched between the lead mode or the trail mode to the repeater mode with the communication device switched to the repeater mode being configured to repeat the command signal in a single direction toward a front end or an opposite trailing end of the multi-vehicle system.

5. The system of claim 1, wherein the communication devices are configured to report status information representing operational conditions of the communication devices, and each of the communication devices is configured to be remotely switched between the lead mode or the trail mode to the repeater mode based on the status information.

6. The system of claim 5, wherein the status information includes one or more of capabilities of the communication devices to operate in the repeater mode, current operating modes of the communication devices, identifiers of vehicles in which the communication devices are disposed, locations of the communication devices, signal strengths of signals transmitted or re-transmitted by the communication devices, or brake pressures measured onboard the vehicles where the communication devices are located.

7. The system of claim 6, wherein the signal strengths are associated with the signals transmitted or re-transmitted by the communication devices toward a lead end of the multi-vehicle system.

8. The system of claim 6, wherein the signal strengths are associated with the signals transmitted or re-transmitted by the communication devices toward a trail end of the multi-vehicle system.

9. A method, comprising:

transmitting a command signal from a first communication device of several communication devices onboard a multi-vehicle system, the first communication device operating in a lead mode;

receiving the command signal at second communication devices of the communication devices onboard the multi-vehicle system, the second communication devices operating in a trail mode;

controlling movement of the multi-vehicle system based on the command signal that is transmitted;

selecting at least one of the second communication devices to switch to a repeater mode based on a strength of the command signal received where the at least one of the second communication devices receives and re-transmits the command signal received from the first communication device; and remotely changing the at least one of the second communication devices that is selected to the repeater mode so that the at least one of the second communication devices in the repeater mode re-transmits the command signal received from the first communication device operating in the lead mode to one or more others of the second communication devices.

10. The method of claim 9, wherein the first communication device operating in the lead mode selects the at least one of the second communication devices to switch to the repeater mode.

11. The method of claim 9, wherein a control center located off-board the multi-vehicle system selects the at least one of the second communication devices to switch to the repeater mode.

12. The method of claim 9, further comprising:

using the at least one of the second communication devices operating in the repeater mode, re-transmitting at least one additional command signal received from the first communication device operating in the lead mode to one or more others of the second communication devices.

13. The method of claim 12, wherein the at least one of the second communication devices re-transmits the at least one additional command signal in a single direction toward a front end or an opposite trailing end of the multi-vehicle system.

14. The method of claim 9, wherein the at least one of the second communication devices is selected to switch to the repeater mode based on status information representing operational conditions of the second communication devices.

15. The method of claim 14, wherein the status information includes one or more of capabilities of the second communication devices to operate in the repeater mode, current operating modes of the second communication devices, identifiers of vehicles in which the second communication devices are disposed, locations of the second communication devices, signal strengths of signals transmitted or re-transmitted by the second communication devices, or brake pressures measured onboard the vehicles where the second communication devices are located.

16. The method of claim 15, wherein the signal strengths are associated with the signals transmitted or re-transmitted by the second communication devices toward a lead end of the multi-vehicle system or toward a trail end of the multi-vehicle system.

17. The method of claim 9, wherein each of the second communication devices is configured to be remotely switched between the lead mode or the trail mode to the repeater mode without requiring an operator to board vehicles in which the second communication devices are disposed.

18. A system, comprising:

communication devices configured to be onboard vehicles in a multi-vehicle system, each of the communication devices configured to operate in a lead mode, a repeater mode, or a trail mode, one or more of the communication devices operating in the lead mode configured to transmit a command signal to control movement of the multi-vehicle system, the communication devices oper-
ating in the repeater mode configured to re-
transmit the command signal received from the one or
more communication devices operating in the lead
mode, the communication devices operating in the trail
mode configured to receive the command signal
received from the one or more communication devices
operating in the lead mode or in the repeater mode,
wherein each of the communication devices is configured
to be remotely switched between the lead mode or the
trail mode to the repeater mode based on status infor-
mation communicated by the communication devices
and without requiring an operator to board vehicles on
which the communication devices are disposed,
wherein a communication device of the communication
devices is configured to switch to the repeater mode
based on a strength of the command signal received.

19. The system of claim 18, wherein the status informa-
tion includes one or more of signal strengths of signals
transmitted or re-transmitted by the communication devices,
or brake pressures measured onboard the vehicles where the
communication devices are located.

\* \* \* \* \*